(12) United States Patent
Emde

(10) Patent No.: US 8,330,355 B2
(45) Date of Patent: Dec. 11, 2012

(54) ILLUMINATION MEANS

(75) Inventor: Thomas Emde, Frankfurt (DE)

(73) Assignee: EMDEOLED GmbH (DE)

( * ) Notice: Subject to any disclaimer, the term of this patent is extended or adjusted under 35 U.S.C. 154(b) by 0 days.

(21) Appl. No.: 12/808,019

(22) PCT Filed: Dec. 11, 2008

(86) PCT No.: PCT/EP2008/010537
§ 371 (c)(1),
(2), (4) Date: Feb. 25, 2011

(87) PCT Pub. No.: WO2009/074322
PCT Pub. Date: Jun. 18, 2009

(65) Prior Publication Data
US 2012/0019128 A1   Jan. 26, 2012

(30) Foreign Application Priority Data
Dec. 13, 2007 (DE) .......................... 10 2007 060 585

(51) Int. Cl.
*H01L 51/00* (2006.01)
(52) U.S. Cl. ........................ 313/504; 313/512
(58) Field of Classification Search ........... 313/498–512
See application file for complete search history.

(56) References Cited

U.S. PATENT DOCUMENTS

| | | | |
|---|---|---|---|
| 6,565,231 B1 | 5/2003 | Cok | |
| 6,787,990 B2 | 9/2004 | Cok | |
| 2006/0197456 A1* | 9/2006 | Cok | ................................ 315/56 |

FOREIGN PATENT DOCUMENTS

| | | |
|---|---|---|
| DE | 60306720 T2 | 8/2007 |
| DE | 60306722 T2 | 8/2007 |
| EP | 1367676 A1 | 12/2003 |
| EP | 1367677 A2 | 12/2003 |

OTHER PUBLICATIONS

International Search Report; International Application No. PCT/EP2008/010537; Date of Completion of the International Search: May 20, 2009; Date of Mailing: May 29, 2009; 2 Pages.
International Search Report; International Application No. PCT/EP2008/010537; Date of Completion of the International Search: May 20, 2009; Date of Mailing: May 29, 2009; English Translation; 2 Pages.
"Surface of Revolution", Retrieved from: http://en.wikipedia.org/w/index.php?title=Surface_of_revolution&oldid=497574121; Retrieved on: Jun. 22, 2012; 3 pages.

* cited by examiner

*Primary Examiner* — Anne Hines
(74) *Attorney, Agent, or Firm* — Cantor Colburn LLP

(57) ABSTRACT

The present invention relates to illumination means (10) based on organic light diodes (OLED), having a layer arrangement (15) with at least one organic light-emitting diode layer (OLED layer), and at least one anode layer and one cathode layer on a carrier, and contact means (22) for the electrical contact of the electrode layers. According to the invention, the OLED layer and at least one electrode layer are attached to the inner side of a dimensionally stable rotation surgace serving as the carrier. According to the invention, the inner surface of a substantially or entirely closed hollow body (11) made of glass, plastic, or another light-transmissice material can serve as a carrier. The invention creates a novel illumination means (10) based on organic light diodes, having a shape that is compatible with a conventional light bulb or fluorescent lamp, and consequently can be exchanged for the same.

20 Claims, 2 Drawing Sheets

ILLUMINATION MEANS

TECHNICAL FIELD

The present invention relates to a lamp based on organic light-emitting diodes (OLEDs), comprising at least one organic light-emitting layer (OLED layer) and at least one anode layer and/or a cathode layer on or in a carrier, as well as contacting means for electrical contacting of the electrode layers. The invention furthermore relates to a method for producing a lamp of the above-described type.

BACKGROUND

The practical significance of OLEDs, which were only developed a few years ago, as lamps has been increasing for some time, as their light output and efficiency has been steadily increasing. So, for example, it is already possible to produce OLEDs with an efficiency of 35 lm/Watt and even up to more than 60 lm/Watt with a brightness of 1000 cd/m$^2$ and a service life of 100,000 hours. The OLEDs are applied in very thin layers of for example only a few nm to a flat carrier. Thin, plate-like, rectangular substrates such as glass plates are for example for the most part used as carriers. In applications of lamps based on OLEDs known so far, these have consequently been consistently considered as a flat light source, as the available OLEDs on plate-shaped carriers of the above-mentioned type are taken as the starting point.

Typical applications for such OLEDs as multi-layer, flat light source on rectangular, rigid carriers are described in DE 60306720 T2. An OLED layer, two electrode layers and an encapsulating covering are applied to a transparent carrier. The latter is provided at one end with contacts on tongue sections, which can be plugged into a type of socket strip with openings so that contacting can take place. The disadvantage of these known OLEDs is on the one hand the fact that the OLED is defined by the manufacturer as a flat, even, plate-shaped light source on a rectangular carrier, and thus there are already limitations in the use of such a light source for the subsequent user. On the other hand, the OLEDs of this type known until now entail technical problems in the regions of the edges of the plate-shaped OLED carrier, as there is a limit line of the very thin layer of the organic light-emitting diode, which can result in irregularities in the light radiation. For example, the flow of the charge carriers can be disrupted in this edge region. Damage to the light-emitting layer has even occurred in this edge region in conventional OLEDs on rectangular carrier. The encapsulation of the organic light-emitting layer is generally necessary, as the organic materials are sensitive to moisture and oxygen.

DE 603 06 722 T2 describes a semiconductor light source for illuminating a region, with a rigid carrier, a flexible substrate which is fixed to the carrier, an organic light-emitting diode layer which is situated on the flexible substrate and has a first and a second electrode for transmitting electrical energy to the OLED layer, an encapsulated covering on the OLED layer, a first and second conductor which are connected electrically to the first and second electrodes and extend beyond the encapsulating covering, and with a connector which is connected to the rigid carrier for removable accommodation in a holder. According to a possible variant of the solution described in this document, it is provided for the even, rectangular carrier which bears the OLED layer to be provided with a socket which has a holder, the dimensions of which are compatible with those of a conventional holder, so that a conventional lamp can be replaced with one created in such a manner based on OLEDs.

A variant likewise described in the above-mentioned document provides for the OLED layer to be applied on a flexible substrate, for example in the form of a film, which can then where necessary be wound in a spiral manner on a for example cylindrical carrier consisting of glass, as a result of which a cylindrical, tube-like, OLED-based lamp is produced, which can in turn be provided with a holder and is then a lamp which can be exchanged with a conventional light bulb or fluorescent tube. In this variant, however, the film which acts as the substrate is thus first coated with the layers necessary for the functioning of the OLED, and only then can such a substrate (the film) which is coated with OLEDs, as it is flexible, be applied to a cylindrical carrier in a further production step. The disadvantage of the OLEDs which are applied to flexible films as the carrier is the fact that the flexible plastic substrate is too permeable to oxygen and air humidity and therefore the organic layer is not sufficiently protected in this case.

The use of very thin glass has also been proposed in order to create a carrier for the organic layer which is flexible to a certain extent. The thin glass is however difficult to process, and also the conventionally used anode material, for example, indium tin oxide, is a hard material and therefore brittle, so that damage to the electrode layer can occur when rolling out such a carrier.

A third variant described in DE 603 06 722 T2 provides for a rectangular, flat, even carrier which is provided with a frame to be produced in turn first, which is coated with the OLED layer and the electrodes, but in miniaturised form, and then for this even, rectangular OLED element, which is virtually already a lamp, to be introduced into the cavity of a glass flask in the form of a light bulb, which is provided with a socket with a holder, in order in this manner to replace the filaments of the light bulb and create an OLED-based light bulb. This procedure however requires after the production of a virtually conventional OLED on a conventional flat carrier the additional step of introducing this element into a hollow body, so that the production process is comparatively complex. A further disadvantage of this solution consists in that only one OLED with a comparatively small area which is effective for light output is used. As the luminosity of the lamp is proportional to the OLED area, only a small light output is obtained also.

Although the solution variants described in DE 603 06 722 T2 include the basic idea of producing lamps using organic light-emitting diodes, which imitate the appearance of a conventional lamp such as the classical light bulb for example and can be used in similar applications, the OLED layer and the electrode layers are always applied to a flexible substrate (in the form of a film) first and only then, in a second step, is this flexible substrate applied, for example adhesively bonded, to a rigid carrier with for example the shape of a cylinder or a truncated cone. The above-described disadvantages of the flexible substrate are thereby retained. It is furthermore necessary to provide the OLED layers on the flexible carrier with a protective layer (to encapsulate them).

This is where the present invention applies. The object of the invention is, proceeding from the above-mentioned prior art, to create an OLED-based lamp which does not have the disadvantages mentioned, allows more versatile applications and in the process allows efficient series production.

DESCRIPTION OF THE INVENTION

The solution of the object provides a lamp according to the invention of the generic type mentioned at the start with the characterising features of the main claim.

It is provided according to the invention for a layer or layer arrangement comprising at least the light-emitting layer to be applied to the inside of a dimensionally stable surface of revolution which acts as the carrier.

Surface of revolution means in this case the surface of a solid of revolution in the sense of the mathematical definition, which arises by rotation of a creating curve around an axis of rotation. Examples of such solids of revolution are spheres, cylinders, tori, ellipsoids, solids of revolution derived from these and those with more complex shapes. The light-emitting layer (or layers) or the layer arrangement of an organic light-emitting diode is in this case applied (in the case of a plurality of layers successively) to the inside of this solid of revolution which acts as the carrier for this/these layer(s). When a plurality of layers is applied, only the first (outer) layer is applied directly to the carrier, and the subsequent layers are then applied to the layer already applied previously in each case.

The surface of revolution is dimensionally stable, that is, it already has its shape in the function as a carrier of the lamp when the layer(s) is/are applied. A solid of revolution is therefore formed first, preferably from glass, plastic or another suitable light-permeable material, which is then coated. In the above-mentioned prior art according to DE 603 06 722 T 2, in contrast, a different procedure is followed, as a flexible and thus deformable substrate is first coated and only then brought into the desired shape. This is only possible with flexible substrates such as films or the like, which have the disadvantages mentioned. With a carrier such as glass or plastic, this conventional procedure would not be considered, because deformation after application would require a correspondingly high temperature at which the OLED layers, in particular the organic emitting layer would be destroyed.

The inside of a largely or completely closed hollow body, preferably consisting of glass, plastic or another light-permeable material preferably acts according to the invention as the carrier. This hollow body can for example consist of a dimensionally stable plastic or ceramic or of another light-permeable (transparent or translucent) material. If plastics are used, there is however the condition according to the current state of the art that the plastic is not permeable to oxygen, which is not the case to a sufficient extent in many conventional plastics. However, even this condition is invalid if OLED substances are available which are not sensitive to oxygen and moisture.

The hollow body is preferably produced in such a manner that the shape of the desired solid of revolution is predefined, with one or a plurality of openings remaining only in predefined regions, which are comparatively small, of a size which is sufficient to be able to coat, for example, vapour-deposit the inner surface of the hollow body subsequently, for example by a suitable coating element being placed through the opening into the cavity. The remaining openings can then be closed afterwards. There is then a completely closed, internally coated hollow body which can be sealed in an airtight and moisture-proof manner. This produces various advantages according to the invention. It is in particular no longer absolutely necessary to provide the sensitive layers of the OLED arrangement with a protective layer or encapsulate them. No further substrate is necessary as the carrier. The sandwich arrangement, which is otherwise often used, in which the OLED layers are embedded between two layers, namely a carrier layer and a protective layer, is unnecessary. The inner surface of the solid of revolution forms the carrier layer, and a covering on the inside of the layer arrangement is unnecessary. The interior of the hollow body can also be filled with a gaseous substance which differs from air and oxygen, and which can be under increased or reduced pressure so that the sensitive layers of the OLED arrangement are protected thereby. It is accordingly advantageous that the shell of the hollow body which acts as the carrier for the coating also protects the OLED layer from the outside environment at the same time. The otherwise necessary, complex step of encapsulating the OLED layer or layer arrangement can thus be omitted.

According to a variant of the invention, the hollow body used could also already comprise one of the electrode layers. Correspondingly suitable electrically conductive and light-permeable materials such as glasses, plastics, ceramic or others are conceivable, so that in this case the inside of the hollow body can be provided directly with the emitting layer and the other layers. Insulation towards the outside could take place, but is not absolutely necessary as the OLEDs are operated in the low voltage range and it would therefore not be dangerous if operated without insulation. In this variant it is possible for the hollow body to be coated with only one layer, namely the light-emitting layer, if the carrier (hollow body) itself forms the first electrode and the second electrode is arranged at a distance from it, for example as a point-like electrode in the centre point of a spherical hollow body or as a rod-shaped electrode in the axis region of a cylindrical hollow body.

A further advantage of the invention compared to conventional OLEDs exists if one of the two electrodes is formed by a non-transparent coating on the carrier. In the conventional OLED with a layer structure on a flat, plate-shaped carrier, light can namely only be radiated to one side with a non-transparent electrode. The second electrode must then be transparent, as it is usually applied over the light-emitting layer. In the solution according to the invention, in contrast, a non-transparent electrode can also be applied to the light-emitting layer, as the electrode layer is then situated inside (in relation to the carrier face of the hollow body), and the light-emitting layer can thus radiate light outwards in an unobstructed manner. This makes it possible to use other materials for this electrode.

The layers which are necessary for the functioning of the OLED arrangement, these are for example at least one first electrode layer, at least one organic emitting layer and at least one second electrode layer, are thus applied in the corresponding manner according to methods known per se in the necessary order one after the other to the inner surface of the hollow body, for example vapour-deposited or applied by sublimation, sprayed, pressed (for example pad printing) or applied by spin-coating, sputtering, or by a coating method in which the solid of revolution is spun, rotated or shaken. The hollow body is preferably then completely closed in order to protect the previously applied layers and avoid an additional protective layer or encapsulation. In this manner a lamp is produced which has for example the shape of a conventional light bulb or fluorescent tube (sphere, flask, bulb or cylinder shape), but has the lighting properties and all the advantages of the OLEDs.

Even the methods applicable according to the invention for coating can be used more effectively than in the conventional coating of even, plate-shaped carriers with OLEDs. In this case, a comparatively high proportion of the valuable coating material is always lost during coating, as it was not deposited in the desired manner on the substrate. It was usually not possible to reuse the material lost due to scattering during the coating. These problems are overcome by the solution according to the invention, because no coating material is lost during coating of the inner face of a largely closed, hollow solid of revolution. If the coating device is introduced into the hollow body, then the coating material can be distributed uniformly in all spatial directions for example by a spray head and likewise be deposited uniformly on the face to be coated.

A further essential advantage of the solution according to the invention consists in that there is no longer a flat, plate-shaped lamp, which entails corresponding limitations in the lighting applications, but rather for example a lamp which is similar in shape to a light bulb or fluorescent lamp and which acts as a virtually point-like or rod-like light source so that the OLED-based lamp according to the invention can be considered for the same lighting applications as a conventional light bulb or fluorescent lamp. This also means that demand increases and production will be possible in larger quantities, as a result of which the production costs, which have been comparatively high until now, can be reduced. An energy-saving lamp with a high luminosity is provided which additionally directly provides white or coloured light in the desired light colour without needing mixing and controlling, as has been the case until now with the use of conventional LEDs. The lamp is functional for the consumer and also fully compatible with conventional lamps in terms of its visual impression, as a result of which faster acceptance on the market can be expected. This is an essential advantage compared with the previously known plate-shaped rectangular OLEDs. As the layers of the OLED arrangement are protected in the (closed) cavity, an increase in the service life can also be expected.

A considerable further advantage compared to the solution known from DE 603 06 722 T2 is also produced from the fact that according to the invention virtually the entire inner surface of the hollow body which is provided with the OLED layers is used for emitting light and thus a correspondingly maximised light output can be achieved. On the other hand, the size of the area which is effective for emitting light when a rectangular OLED is introduced into the hollow body of a light bulb is only a fraction of the area which can be achieved according to the invention.

An essential advantage also consists in that the OLED layers are applied to an inherently closed curved area, namely the inner face of the hollow body. As the inner face of a solid of revolution, this area only has a minimal edge length, namely in the case of for example a flask shape only in the neck region of the flask (towards the socket) where the layers end. In relation to the entire coated surface, this edge length is very small, so that the problems described above in the threshold regions where the layers end are no longer relevant, or only to a much reduced extent. Because the edge regions (border regions) of the coating are now hardly present, it can be assumed that the service life of a lamp according to the invention is much higher than that of conventional, flat, usually rectangular OLEDs.

A further essential advantage of the OLED compared to the LED as a lamp is the wider colour spectrum of the emitted light, which comes closer to natural daylight in the OLED. LEDs are in contrast usually largely monochromatic in terms of their radiation. These advantages also apply in comparison with energy-saving lamps and halogen lamps.

An alternative variant of the invention allows the production of lamps with an essentially cylindrical shape, the visual impression of which corresponds to known fluorescent tubes, and which can also be designed to be the same as conventional fluorescent lamps in terms of dimensions and contacting means (lamp socket). This has the considerable advantage that, in lights present at the consumer, the previous conventional lamp can be replaced without problems by a lamp according to the invention. Likewise, conventional light bulbs, including flask or candle-shaped ones, energy-saving lamps or halogen lamps can now be replaced by an OLED-based lamp according to the invention, the shape and dimensions of which correspond to the conventional lamp that it is replacing in each case.

A preferred possible design variant of the solution according to the invention provides for the second electrode to be arranged separately from the layer arrangement in the cavity at a distance from the inner face of the hollow body, which second electrode acts as one of the electrodes of the organic light-emitting diode (OLED) arrangement. The layer arrangement which is applied to the inner face of the hollow body must in this case comprise only one of the two electrodes. The second electrode can for example be approximately point-shaped, spherical or rod-shaped, wire-shaped, ring-shaped, flat or grid-shaped and in the case of an approximately spherical or bulb-shaped hollow body be arranged approximately in its centre point so that the distance from the coated inner surface is approximately equal in all directions of the space. In this case the cavity could be filled with an electrically conductive gas (or vapour) so that the charge is transmitted from one electrode to the other via the charge carriers contained in the gas. This solution variant is also considered for approximately cylindrically-shaped hollow bodies. The second electrode could then be for example rod- or wire-shaped.

Such a gas which is situated in the cavity can have further positive effects on the luminosity and/or the service life of the lamp, for example a cooling effect. The cavity can also be filled with gaseous substances which themselves have luminous properties during operation of the lamp, as a result of which for example the light colour of the emitted light can be affected or the luminosity can be increased.

A second electrode could also be constructed from an electrically conductive liquid with which the cavity is filled. This liquid electrode would then replace the second electrode which is provided at a distance from the layer arrangement according to the above-mentioned variant and the electrically conductive gas.

In order to increase the light output, it is for example also possible according to an advantageous configuration to position a plurality of hollow bodies of different sizes of the type according to the invention inside each other, for example a plurality of approximately spherical hollow bodies concentrically inside each other or a plurality of cylindrical hollow bodies coaxially inside each other. The effective luminous area can be increased with the same space requirement by this virtually nested arrangement of a plurality of geometrically similar hollow bodies.

In an alternative preferred design solution variant, both electrodes are situated in the layer arrangement on the inner surface of the hollow body as in the previously known OLEDs, and the multi-layer OLED arrangement preferably has the following layer structure: one first light-permeable electrode layer (anode or cathode) which is applied directly to the inside of the glass which acts as the carrier, at least one organic emitting layer which is applied to this electrode layer, at least one second electrode layer which is applied to the emitting layer. The second electrode layer is preferably the top (innermost) layer of the layer arrangement, which means an additional protective covering layer or encapsulation can be omitted, as the cavity can be closed off from the external environment and where necessary be filled with a gas which protects the OLED layers.

The lamp according to the invention is preferably provided on the outside with at least one lamp socket, with all usual forms of lamp sockets coming into consideration, for example screw socket, plug-in socket, bayonet socket etc. A lamp is thereby created which is compatible with the holder systems on the market. The socket has the contacts necessary for electrical contacting. In the cylindrical variant, corresponding sockets are preferably provided in each case at both ends, for example for a plug-in connection or twist-plug-in connection corresponding to the systems known for fluorescent lamps, for example by means of pins or the like.

The subject of the present invention is furthermore a method for producing a lamp, in which first a hollow body is produced from glass, plastic or another light-permeable material, which is closed except for one or a plurality of openings which are comparatively small in relation to the surface area of the hollow body, then in the next work step the inner surface of the hollow body which acts as the carrier is provided with an OLED arrangement of one or a plurality of layers and then finally the remaining opening(s) of the hollow body are sealed in an airtight manner.

The application of at least one of the layers of the OLED arrangement preferably takes place by vapour-depositing, spraying, pressing the inner surface of the hollow body with the corresponding coating medium or by spin-coating, sputtering, sublimation or a coating method with spinning, rotating or shaking of the solid of revolution. The latter methods have the advantage that a good uniform distribution of the coating medium on the inner surface of the hollow body can be achieved in this manner. This is also an advantage compared to conventional OLEDs in which a flat carrier is coated on one side so that these methods cannot be used. Moreover, no coating medium is lost in the method according to the invention.

The layer arrangement can also contain at least one further layer which has light-scattering or reflecting properties and extends where necessary only over part of the coated inner surface. This generally outermost layer or part layer of the layer arrangement (that is, applied directly to the inner surface of the carrier) can be used to vary the light output, for example allowing it only or to an increased extent in certain desired spatial directions.

According to a variant of the invention, at least one further layer can also be applied at least in regions to the surface of the hollow body before the outer electrode layer, which further layer is constructed in a manner in which it is opaque, or reflects, deflects or scatters light, or changes the light colour, or the outer electrode layer itself at least in regions can be constructed in a manner in which it is opaque, or reflects, deflects or scatters light, or changes the light colour. Similar effects to those described above can thereby be achieved, for example directed radiation only in defined part regions of the hollow body or changed light radiation characteristics in these part regions.

The features mentioned in the subclaims relate to preferred developments of the solution of the object according to the invention. Further advantages of the invention can be drawn from the detailed description below.

BRIEF DESCRIPTION OF THE DRAWINGS

The invention is described in more detail below using exemplary embodiments with reference to the attached drawings. In the figures.

Figure 1:
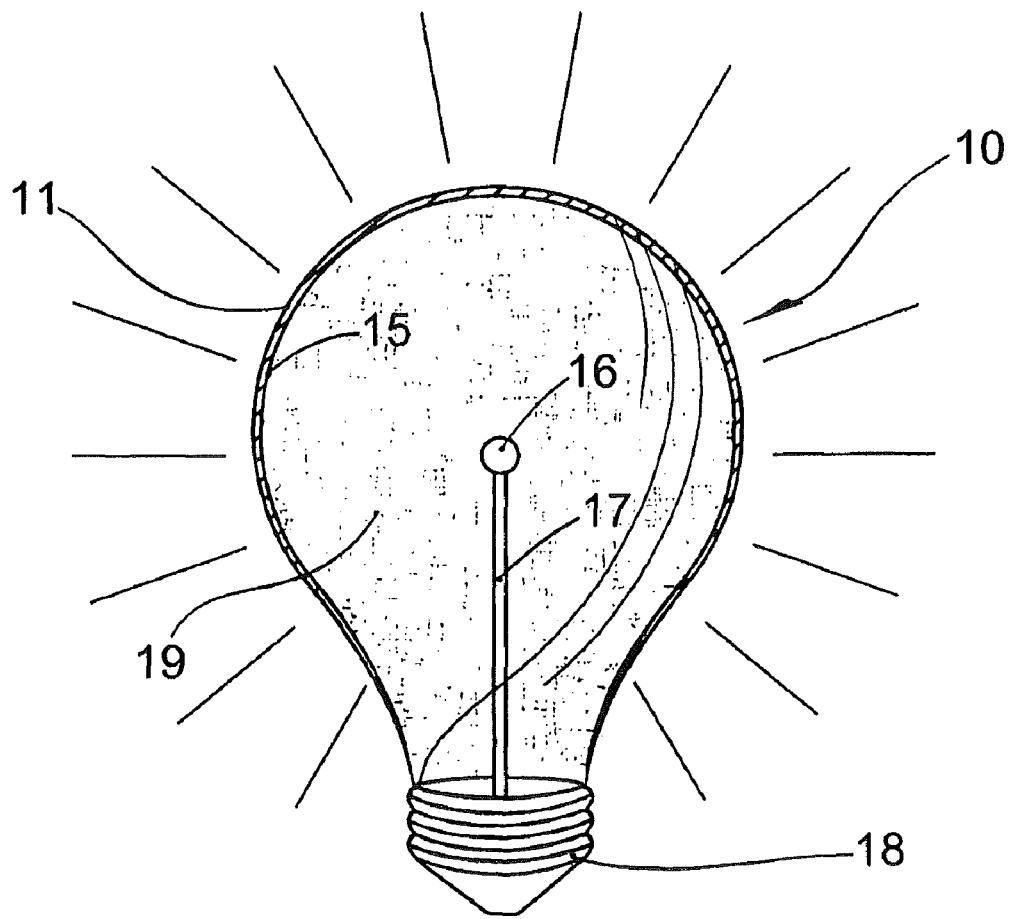
FIG. 1 shows a schematically simplified perspective view of a lamp according to a first variant of the invention.

Reference is first made to FIG. 1, which shows a theoretical diagram of a lamp 10 according to the invention, which in principle has the outer geometric shape of a conventional light bulb. The lamp comprises a hollow body 11 consisting of glass in the form of a partially approximately spherical solid of revolution (flask-like shape or bulb shape), which acts as the carrier for a multi-layered layer arrangement 15, which forms the organic light-emitting diode. The first electrode 12 is in the variant according to FIG. 1 part of the layer arrangement 15 which also contains the emitting layer which outputs light when excited (see also FIG. 2). This first electrode is electrically connected to first electric contacts which are not shown here and are situated for example in the region of the socket 18 of the lamp. This socket 18 can be configured like for example a screw-socket of a conventional light bulb. The second electrode of the OLED arrangement is in the variant of FIG. 1 a virtually point-shaped electrode 16 (in principle a small sphere or the like) which is situated at one end of an approximately rod-shaped fitting 17, which is in turn connected to second electrical contacts (not shown here). In order to create an electrically conductive medium, the cavity of the hollow body can contain a gaseous medium 19 which contains electrically charged particles, for example ions and behaves non-reactively to the layers 15 of the OLED arrangement but allows the transfer of charge between the two electrodes 12, 16.

Figure 2:
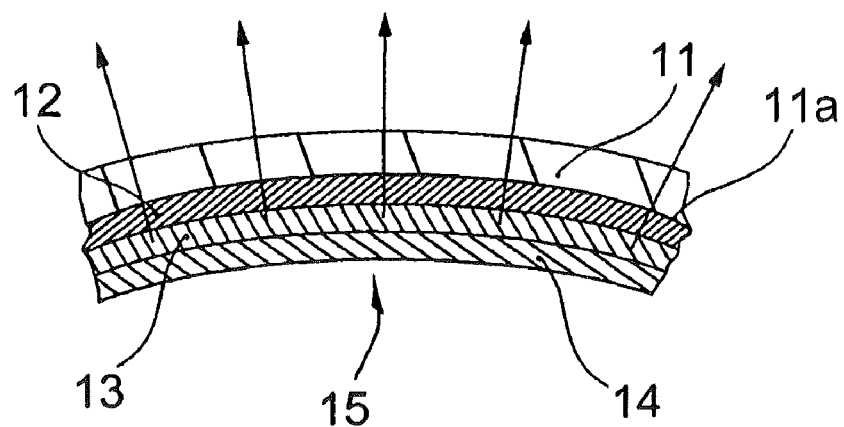
FIG. 2 shows an enlarged sectional diagram through a part section of the wall of the hollow body of a lamp according to a solution variant which is similar but slightly modified compared to that in FIG. 1.

FIG. 2, in a sectional diagram, shows an exemplary structure of the layer arrangement 15 for a variant which is slightly modified compared to FIG. 1, in which both electrodes are contained in the layer structure as in a conventional OLED, so that in this case the electrode 16 and the conductive medium 19 in the cavity shown in FIG. 1 can be omitted. This layer arrangement 15 comprises a first outer electrode layer 12, which is applied, for example vapour-deposited, to the glass which acts as the carrier and thus to the inner surface 11a of the hollow body 11. An emitting layer 13 is applied, for example by sublimation or vapour-deposition to the first electrode layer 12. This emitting layer 13 is the layer which contains the organic substance which emits light in the desired light colour when excited. This emitting layer can be constructed in a multi-layer and more complex manner, as with the electrode layer 12, which is however not shown in the simplified diagram according to the section of FIG. 2. Finally, the second electrode layer 14, which can also be constructed in a multi-layer manner (not shown here), is applied to the emitting layer 13. In this variant of the invention, this structure of at least three layers 12, 13, 14 forms the OLED layer arrangement which outputs light in principle in all directions of the space through the transparent or at least translucent hollow body 11 which consists of glass. As the emitting layer 13 is covered by the first electrode layer 12 towards the outside, the latter layer 12 is generally also transparent in order to allow the light through. Corresponding transparent electrodes are known from the conventional OLEDs.

Figure 3:
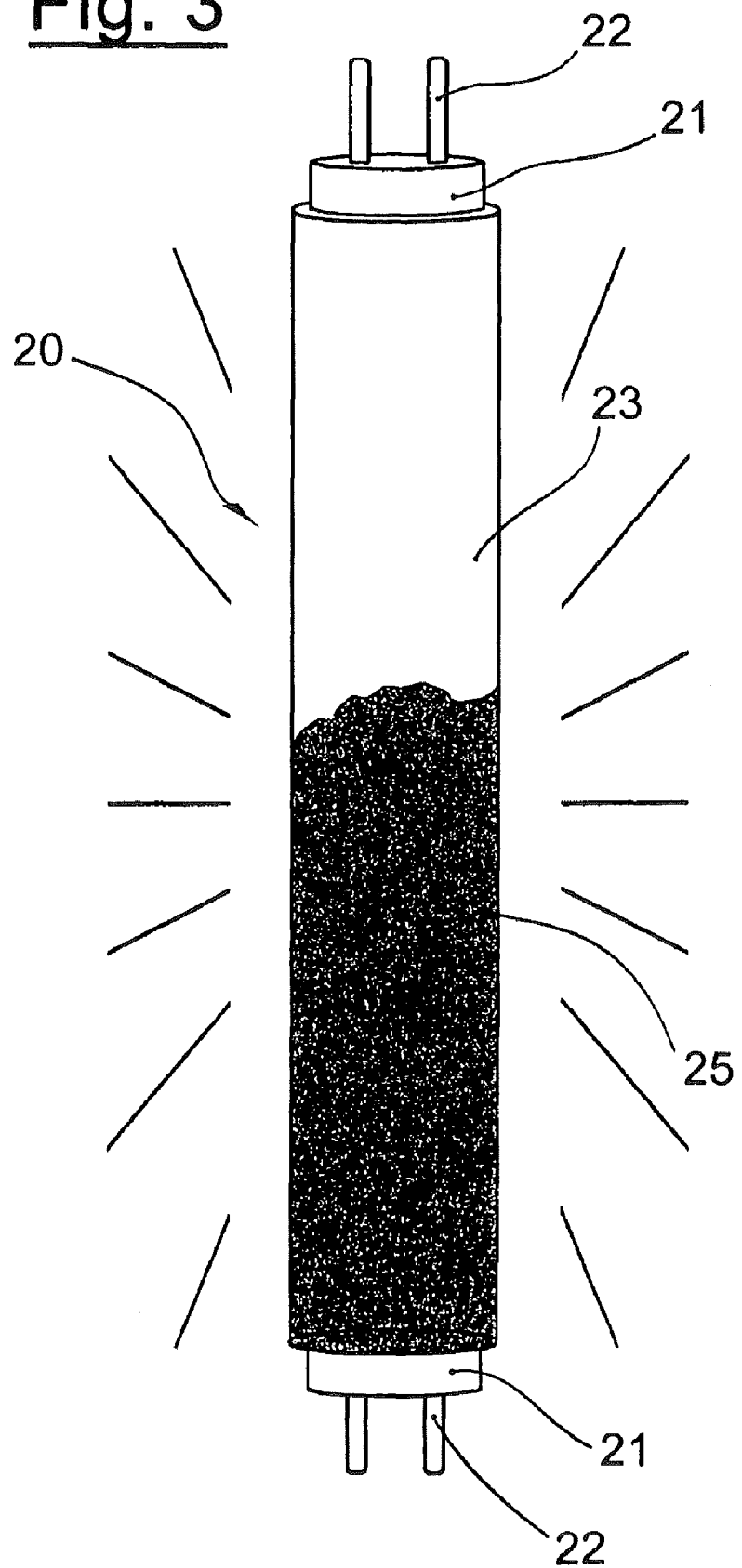
FIG. 3 shows a schematically simplified side view of a lamp according to a further exemplary embodiment variant of the invention.

A further alternative embodiment variant of a lamp according to the invention is described below with reference to FIG. 3. The diagram shows a partially cut away side view of a lamp 20, which has the cylindrical geometry and the impression of a conventional rod-shaped fluorescent lamp. Lamp sockets 21 with plug-in contacts 22 are provided at each end in each case so that the lamp 20 can be fixed in a conventional holder for a fluorescent lamp. The lamp is configured as an essentially cylindrical hollow body 23 consisting of glass, to the inner surface of which a multi-layered layer arrangement 25 is applied, for example by vapour-deposition, which for example has the layer structure shown in FIG. 2 for the layer arrangement. Reference is made to the above embodiments relating to FIG. 2. The two electrodes contained in this layer structure of the layer arrangement 25 are electrically connected to the respective plug-in contacts 22 of the fluorescent lamp. In this variant too, the OLED layers are situated in a closed cavity, with even the cylindrical hollow body 23 acting as a carrier for the outer layer of the layer arrangement. As the cavity is sealed off in an airtight manner towards the outside, encapsulation of the innermost layer is not necessary. In this case too the hollow body 23 consists of glass and is transparent or translucent, so that the light can be output outwards in principle all spatial directions through the glass. The lamp 20 thus forms a rod-shaped lamp which is compatible with a conventional fluorescent lamp and consequently allows replacement without problems.

The invention claimed is:

1. A lamp, comprising at least one organic light-emitting (OLED) layer and at least one anode layer and/or a cathode layer on or in a carrier, as well as contacting means for electrical contacting of the electrode layers,
wherein a layer or layer arrangement (15) comprising at least the light-emitting layer (13) is applied to the inside of a dimensionally stable surface of revolution which acts as the carrier,
characterised in that the inner face of a largely or completely closed hollow body (11, 23) consisting of glass, plastic, ceramic or another light-permeable material acts as the carrier.

2. The lamp according to claim 1, characterised in that the inner face (11a) of an at least in sections spherical, cylindrical, ellipsoidal, or flask-shaped solid of revolution (11, 23) is coated with the OLED layer (13) and this solid of revolution is further coated with at least one electrode layer (12, 14), or the carrier itself comprises at least one electrode layer.

3. The lamp according to claim 1, characterised in that the inner face of the carrier (11, 23) which acts as a substrate is provided directly with at least one of the layers which are essential for the functioning of the organic light-emitting diode, is vapour-deposited, sprayed, pressed with one of the electrode layers (12), or has an electrode layer, which is essential for the functioning and is applied by spin-coating, sputtering, sublimation or a coating method with spinning, rotating or shaking of the solid of revolution.

4. The lamp according to claim 1, characterised in that essentially the entire available inner face or only a defined part-region of the carrier which is constructed as a hollow body is covered with a single- or multi-layered arrangement (15) of the layers which are essential for the functioning of the organic light-emitting diode.

5. The lamp according to claim 1, characterised in that it has the form of a light bulb (10), fluorescent tube (20), flask-shaped lamp, spherical lamp, candle-shaped lamp or the like.

6. The lamp according to claim 1, characterised in that the interior of the hollow body (11, 23) is sealed off from the environment in an airtight manner.

7. The lamp according to claim 6, characterised in that the interior of the hollow body (11, 23) contains an atmosphere with one or a plurality of gaseous, where necessary electrically conductive substances which are different from air or oxygen, where necessary under reduced pressure.

8. The lamp according to claim 1, characterised in that at least one second electrode (16) is arranged separately from the layer arrangement in the cavity at a distance from the inner face of the hollow body (11), which second electrode acts as one of the electrodes of the organic light-emitting diode arrangement.

9. The lamp according to claim 1, characterised in that the multi-layer OLED arrangement (15) has the following layer structure: one first transparent electrode layer (12) (anode or cathode) which is applied directly to the inside of the carrier, at least one organic emitting layer (13) which is applied to this electrode layer, at least one second electrode layer (14) which is applied to the emitting layer.

10. The lamp according to claim 9, characterised in that the second electrode layer (14) is the top and innermost layer of the layer arrangement (15).

11. The lamp according to claim 1, characterised in that the hollow body (11, 23) is provided with at least one lamp plug (18, 21).

12. The lamp according to claim 1, characterised in that at least one second electrode is an approximately point-shaped electrode (16).

13. The lamp according to claim 12, characterised in that the hollow body (11) has the shape of a sphere or a shape derived from the spherical shape with a spherical section and a moulded on neck region, and at least one second electrode (16) is arranged approximately in the centre point of the sphere or of the spherical section.

14. The lamp according to claim 13, characterised in that the shape derived from the spherical shape with a spherical section and a moulded on neck region is flask shaped or bulb shaped.

15. The lamp according to claim 12, characterised in that the approximately point-shaped electrode (16) is arranged approximately in the centre point of the hollow body.

16. The lamp according to claim 1, characterised in that the hollow body (23) has approximately the shape of a cylinder, and at one end a lamp plug is provided or on both ends in each case in the end face regions a lamp plug (21) is provided with contacting means (22) for electrical contacting, wherein a second rod-shaped, wire-shaped or ring-shaped electrode is optionally present and is arranged approximately in the region of the centre axis of the hollow body.

17. A method for producing a lamp according to claim 1, characterised in that first a hollow body is produced from glass, plastic, ceramic or another light-permeable material, which is closed except for one or a plurality of openings which are comparatively small in relation to the surface area of the hollow body, in that in the next work step the inner surface of the hollow body (11) which acts as the carrier is provided with an OLED arrangement (15) of one or a plurality of layers and in that finally the remaining opening(s) of the hollow body are sealed in an airtight manner; and
further characterised in that the inner face of the carrier (11, 23) which acts as a substrate is provided directly with at least one of the layers which are essential for the functioning of the organic light-emitting diode, is vapour-deposited, sprayed, pressed with one of the electrode layers (12), or has an electrode layer, which is essential for the functioning and is applied by spin-coating, sputtering, sublimation or a coating method with spinning, rotating or shaking of the solid of revolution.

18. The method for producing a lamp according to claim 17, characterised in that at least one further layer is applied which has properties which scatter, deflect or reflect light or change the light colour.

19. The method for producing a lamp according to claim 18, characterised in that the at least one further layer extends only over a part-region of the coated inner surface of the hollow body.

20. The method according to claim 17, characterised in that at least one further layer is applied at least in regions to the surface of the hollow body before the outer electrode layer, which is constructed in a manner in which it is opaque or reflects, deflects or scatters light, or changes the light colour, that the outer electrode layer at least in regions is constructed in a manner in which it is opaque or reflects or scatters lights, or additional elements are arranged in the cavity which deflect, scatter or reflect the light or change the light colour.

* * * * *